April 27, 1965　　F. HELFER ET AL　　3,180,180
MOTOR VEHICLE TRANSMISSION
Filed April 16, 1962　　4 Sheets-Sheet 1
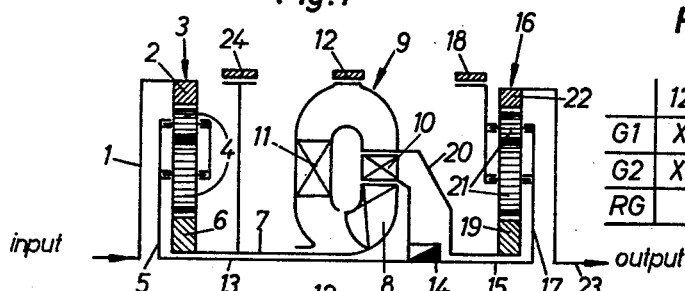
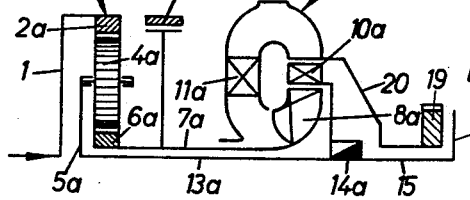
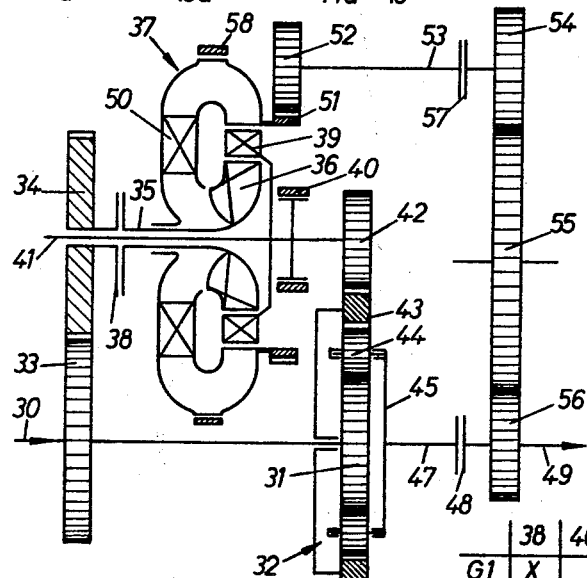

April 27, 1965   F. HELFER ET AL   3,180,180
MOTOR VEHICLE TRANSMISSION
Filed April 16, 1962   4 Sheets-Sheet 2
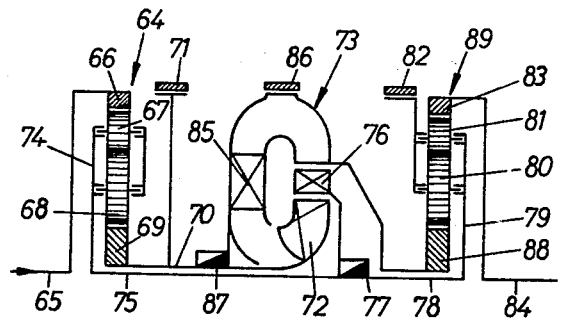
Fig. 5
Fig. 6
|  | 71 | 82 | 86 | 77 | 87 |  |
|---|---|---|---|---|---|---|
| G1 |  |  | X | X |  | hm |
| G2 | X |  | X |  |  | m |
| RG |  | X | X |  |  | h |
| A |  |  |  |  | X | m |
| B |  | X |  | X | X | h |
Fig. 7
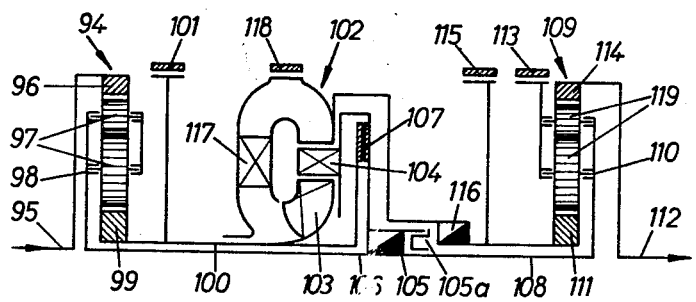
Fig. 7a
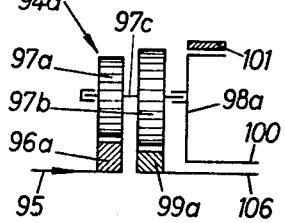
Fig. 8
|  | 101 | 113 | 115 | 118 | 107 | 105a |  |
|---|---|---|---|---|---|---|---|
| G1 |  |  | X |  |  |  | hm |
| G2 |  |  | X | X |  |  | m |
| G3 | X |  | X | (X) |  |  | m |
| RG |  | X |  |  |  |  | h |
| B1 |  |  | X | X | X |  | m |
| B2 |  | (X) | X | X | X |  | hm |
| B3 | X |  | X |  |  | X | hm |
| B4 | X |  | (X) | X |  | X | hm |

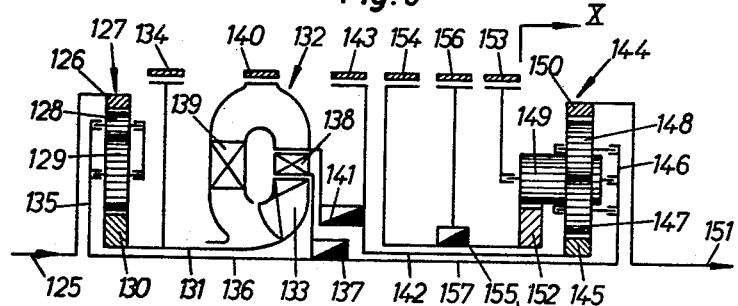
Fig. 9
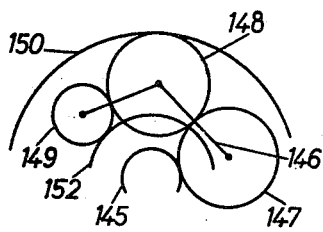
Fig. 10
Fig. 11
|   | 134 | 140 | 143 | 153 | 154 | 156 |    |
|---|-----|-----|-----|-----|-----|-----|----|
| G1 |    |     |     |     |     | X   | hm |
| G2 |    | X   |     |     |     | X   | hm |
| G3 | X  | (X) |     |     |     | X   | m  |
| G4 | X  | (X) | X   |     |     | (X) | m  |
| G2/3 |  | (X) | X   |     |     | (X) | hm |
| RG |    |     | X   |     |     |     | h  |
| B  | X  | (X) |     |     | X   | (X) | m  |
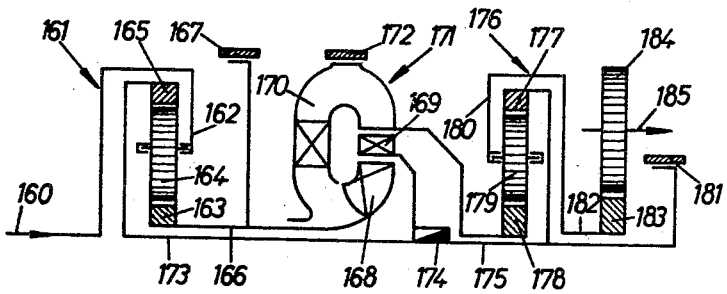
Fig. 12
|   | 172 | 181 | 167 |    |
|---|-----|-----|-----|----|
| G1 | X  |     |     | hm |
| G2 | X  |     | X   | m  |
| RG |    | X   |     | h  |
Fig. 13

|    | 198 | 202 | 211 | 213 | 199 | 199a | 209 | 209a | 212 |     |
|----|-----|-----|-----|-----|-----|------|-----|------|-----|-----|
| G1 |     |     |     | X   | X   |      | X   |      | X   | hm  |
| G2 |     |     | X   | X   | X   |      | X   |      |     | m   |
| G3 |     | X   | (X) | X   | X   |      |     |      |     | m   |
| G4 | X   |     | X   | X   |     |      | X   |      |     | m   |
| RG | X   |     |     |     | X   |      |     |      | X   | h   |
| B1 |     | X   | X   |     | X   |      |     |      |     | hm  |
| B2 |     | X   | X   |     | X   |      | X   |      |     | m   |
| B3 |     | X   |     | X   | X   |      |     |      |     | m   |
| B4 |     | X   |     | X   | X   |      | X   |      |     | hm  |
| B5 |     | X   |     |     | X   |      | X   | X    |     | hm  |
| B6 | X   |     | X   |     |     |      |     | X    |     | hm  |
| B7 | X   |     | X   | X   |     |      |     | X    |     | m   |

United States Patent Office 3,180,180
Patented Apr. 27, 1965

3,180,180
MOTOR VEHICLE TRANSMISSION
Friedrich Helfer, Heidenheim (Brenz), and Josef Raunecker, Stuttgart-Ost, Germany, assignors to Voith-Getriebe KG., Heidenheim (Brenz), Germany
Filed Apr. 16, 1962, Ser. No. 187,739
Claims priority, application Germany, Apr. 18, 1961, V 20,506
14 Claims. (Cl. 74—677)

The present invention relates to transmissions and, more specifically, to a vehicle transmission. Transmissions, so-called differential converter transmissions, are known in which the motor output is conveyed partly through a hydraulic power path and partly through a mechanical power path. A planetary gear transmission serves either as a power dividing transmission or as a totalizing transmission. If a power dividing transmission is provided, one element of the planetary gear transmission is drivingly connected to the motor shaft, while another element of the planetary gear transmission is drivingly connected to the primary part of a torque converter. A third member of the planetary gear transmission is in this instance connected to an output shaft. The secondary part of the converter is, in most instances through a free wheel drive, likewise connected to the output shaft. With a totalizing transmission, an element of the planetary gear transmission is drivingly connected with the secondary part of a torque converter while the second element of the planetary gear transmission is connected to the motor shaft, and the third element of the planetary gear transmission is connected to the output shaft. The primary part of the torque converter is driven by the motor shaft.

The main advantage of differential converter transmissions over a purely mechanical transmission consists in that it adapts itself automatically to the various output resistances, which means that within a certain velocity range, it changes the transmission ratio between motor shaft and output shaft automatically and in a stepless manner so that for instance with a differential converter transmission with a power dividing transmission, the motor output will, with the output shaft at a standstill, be transmitted purely hydraulically and will, with increasing output speed, be increasingly transmitted through the mechanical power path. In this way, the motor output will be better exploited than is the case with the heretofore customary stepped gear transmission. The main advantage of the differential converter transmission over a converter transmission is to be seen in that the degree of efficiency is higher in view of the fact that the power path is partially transmitted mechanically.

It is also known that with such differential converter transmissions a second purely mechanical velocity range can be obtained in a simple manner by making the hydraulic power path ineffective, for instance by braking the same fast when employing a power dividing transmission. Generally, it is necessary to arrange a reduction or stepdown transmission which follows the differential converter transmission, said reduction transmission adapting the speed to the respective requirement.

It is also known for purposes of obtaining a rearward drive in a power dividing converter transmission to brake fast the turbine wheel of the torque converter and to connect the rotatable guide wheel with the output shaft so as to permit the guide wheel to rotate with the output shaft.

It is an object of the present invention to provide a motor vehicle transmission which will comprise a new connection of transmission elements in order to simplify the construction of the transmission.

It is also an object of this invention to provide a motor vehicle transmission as set forth in the preceding paragraph which will nevertheless permit a plurality of velocity ranges, especially also a hydraulic rearward drive.

These and other objects and advantages of the invention will appear more clearly from the following specification in connection with the accompanying drawings, in which:

FIG. 1 is a two-speed transmission with a power dividing transmission and a rearward speed while a planetary gear transmission is designed as subsequent transmission.

FIG. 1a diagrammatically illustrates a similar transmission as FIG. 1 but differs therefrom by a different power dividing transmission and by a rearward converter.

FIG. 2 illustrates a table of the speeds which may possibly be obtained by a transmission according to FIGS. 1 and 1a.

FIG. 3 is a two-speed transmission with a totalizing transmission, a rearward speed and with a subsequent spur gear transmission equipped with separable clutches.

FIG. 4 is a table concerning the possible speeds to be made effective by means of the transmission according to FIG. 3.

FIG. 5 is a two-speed transmission with power divider return speed via the guide wheel, subsequent planetary gear transmission and with a hauling speed and brake speed.

FIG. 6 is a shifting diagram for the arrangement of FIG. 5.

FIG. 7 is a three-speed transmission with a bridgeable converter and with additional braking possibility and rearward speed.

FIG. 7a is a similar transmission which differs from FIG. 7 by its power dividing transmission.

FIG. 8 is a table concerning the possible speed shifting operations according to the transmissions of FIGS. 7 and 7a.

FIG. 9 is a five-speed transmission with particularly high starting torque at the first speed, with rearward speed, and a four-member subsequent planetary gear transmission.

FIG. 10 is a diagrammatic front view of the subsequent four-member planetary gear transmission.

FIG. 11 shows a shift diagram of the transmission according to FIG. 9.

FIG. 12 is a two-speed transmission with non-aligned input and output shafts.

FIG. 13 illustrates a shift diagram for the transmission of FIG. 12.

*General arrangement*

Figures 14, 15:
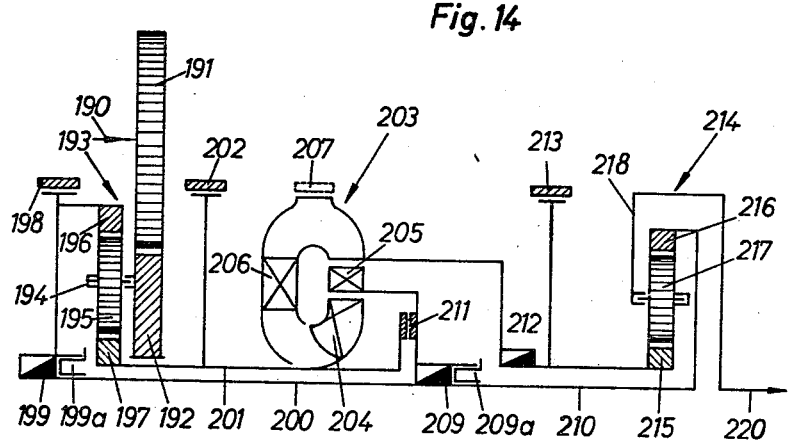
FIG. 14 is a four-speed transmission with bridgeable converter and rearward speed.
FIG. 15 is a speed diagram of the transmission according to FIG. 14.

The present invention is characterized primarily by the combination of the following features:

(a) The transmission comprises a purely mechanical power path and a hydraulic power path arranged in parallel to said mechanical power path and provided with a fluid flow converter having a guide wheel adapted to be disengaged from its stationary support, said transmission also comprising a change gear transmission arranged behind said two power paths;

(b) At the dividing point and/or at the uniting point of said two power paths, there are respectively provided a power dividing and power totalizing planetary gear transmission;

(c) The hydraulic power path is disengageable;

(d) The connecting shaft between the uniting point of the two power paths and the following change gear transmission is provided with a brake;

(e) The change gear transmission in addition to the input drive connected to said connecting shaft also comprises a further input drive connected to the guide wheel and is so designed that at least one of said input drives may selectively be drivingly connected to the output shaft of the motor vehicle transmission.

Advantageously, in this connection, the rotatable drive wheel of the converter is in a manner known per se provided with a brake.

With transmissions having a power dividing planetary gear transmission it is furthermore suggested that when looking in the power flow direction, behind the turbine wheel of the converter there is arranged in a manner known per se a free wheel drive which disengages itself when the connecting shaft behind said free wheel drive reaches a higher speed of rotation than the turbine wheel, and it is furthermore suggested that the pump wheel is adapted to be braked fast by means of a brake. If the transmission behind the connecting point is designed as a totalizing transmission, the turbine wheel of the converter will be designed so that it may be held stationary, for instance by means of a brake. Furthermore, either the converter is designed so that it may be emptied, or the primary shaft of the converter is designed so as to be adapted to be disengaged from the driving shaft, by means of a separating clutch.

Transmissions of this type have at least two forward speeds and one rearward speed (converter speed). In order to obtain the first forward speed (differential converter speed), only the guide wheel is held stationary so that in this way the hydraulic and mechanical power paths will be made effective, whereas the brake at the connecting shaft will be disengaged, and the connecting shaft itself will be coupled to the output shaft.

For the second forward speed (purely mechanical drive), the hydraulic power path is made ineffective. To this end, for instance with transmissions having a power divider, the primary shaft of the hydraulic power path is braked fast, whereas with totalizing transmissions, the torque converter is emptied or the primary shaft of the converter is disengaged from the input shaft by means of a separating clutch.

With the rearward speed, the guide wheel is coupled with the output shaft, and the above mentioned connecting shaft (turbine wheel of the converter) is braked fast. Thus, the rearward speed is a power converter speed without power division.

It is also possible during forward drive with engaged rearward speed to brake by means of the converter, and during rearward speed to brake by means of the first forward speed.

A particularly favorable arrangement of the subsequent change gear transmission will be obtained by designing the change gear transmission as a planetary gear transmission in which instance one member of said planetary gear transmission is connected with the output shaft of the motor vehicle drive while a second member of the said planetary gear transmission is connected with the guide wheel of the converter, and a third member of said planetary gear transmission is connected with the above mentioned connecting shaft (between the two power paths on one hand and the subsequent planetary gear transmission on the other hand). With this arrangement of a planetary gear transmission, separating clutches for selectively connecting the connecting shaft or guide wheel with the output shaft will be superfluous. Instead of the separating clutch, a brake will then be employed which brakes fast the connecting shaft during the rearward speed. In both forward speeds, together with the guide wheel, also a member of the said subsequent planetary gear transmission will be held stationary.

An advantageous transmission arrangement furthermore consists in that with a transmission having a power dividing planetary gear transmission and a subsequent change gear transmission in form of a planetary gear transmission with three elements each, the two planetary gear transmissions are of the same design and are so connected that two corresponding elements are respectively connected with the input shaft and the output shaft while two further corresponding members are respectively connected to the pump wheel and the guide wheel of the converter, and while the third elements are connected to each other. The advantage of this transmission arrangement, in addition to the transmission ratio of 1:1 between the motor shaft and the output shaft in the second forward speed consists primarily in that the production of two planetary gear transmissions of the same design naturally simplifies the overall production process.

If with a transmission having a power division, the pump wheel of the torque converter is in a manner known per se adapted to be coupled to the turbine wheel of said converter (for instance by a bridging friction clutch), and if that portion of the bridging clutch which is connected to the turbine wheel is arranged between said turbine wheel and the subsequent free wheel drive, a further forward speed will be possible, due to the fact that in bridged condition, the converter will have a rigid transmission ratio of 1:1. This forward speed may thus be located between the heretofore first and second speed. In order to assure that in this connection the stationary guide wheel will not cause any losses, the converter may, for instance, be emptied. However, it is more advantageous when looking in the direction of the power flow, to provide a free wheel drive behind the guide wheel and to arrange a brake behind said free wheel drive and to provide that this free wheel drive with the brake engaged and the guide wheel brake disengaged will hold the guide wheel stationary during torque converter operation. In the speed with bridged converter, all converter parts will thus rotate with each other and will be ineffective.

If the subsequent planetary gear transmission is designed with four members, and if the fourth member is adapted to be braked, a further speed will be obtainable.

*Structural arrangement*

Referring now to the drawings in detail and FIG. 1 thereof in particular, the transmission shown therein comprises an input shaft 1 for connection with the engine. Connected to said input shaft 1 is the outer gear ring 2 of a power dividing one-plane planetary gear transmission 3. The engine output is furthermore conveyed from outer gear ring 2 through pairs of planetary gears 4 to the planetary gear carrier 5 and also to the sun wheel 6 of the planetary gear transmission 3. At the sun wheel 6 starts the hydraulic power path of the transmission, which hydraulic power path comprises a hollow shaft 7 leading to the pump wheel 8 of a converter 9 and through a turbine wheel 10 or guide wheel 11 of the converter 9. Said guide wheel 11 is rotatably journalled and is adapted to be held stationary by a band brake 12.

The mechanical power path branches off from the planetary gear transmission 3 through planetary gear carrier 5 which latter is connected to a shaft 13.

The hydraulic power path for forward drive extends from turbine wheel 10 through a free wheel drive 14 to a connecting shaft 15 which in this instance forms an extension of shaft 13 and connects the now interconnected power paths to a subsequent planetary gear transmission 16. With this arrangement, the connecting shaft 15 is connected with the planetary gear carrier 17 of said subsequent planetary gear transmission 16, said planetary gear carrier 17 being adapted to be held stationary by means of a band brake 18. The sun wheel 19 of the subsequent planetary gear transmission 16 is rigidly connected to guide wheel 11 through the intervention of a hollow shaft 20. Pairs 21 of planetary gear wheels of the planetary gear carrier 17 mesh with the sun wheel 19 and with an outer gear ring 22, which latter is connected to the output shaft 23 of the transmission. The pumping wheel 8 is adapted to be held stationary by means of a band brake 24. The transmission shown in FIG. 1a is designed similarly to that of FIG. 1. The arrangement of FIG. 1a differs from the arrangement of FIG. 1 in that the ordinary converter 9 (forward converter) is replaced by a rearward converter 9a the turbine wheel 10a of which is so bladed that it will be driven by pump wheel 8a in a direction of rotation which is the opposite of that of the pump wheel. Furthermore, instead of the power dividing planetary gear transmission 3 with pairs of planetary gears 4, FIG. 1a has a simple power dividing planetary gear transmission 3a with individual planetary gears 4a between the outer gear ring 2a and the inner gear ring 6a. With the transmission of FIG. 1a, the two shafts 7a and 13a which are respectively connected with the pump wheel 8a and through free wheel drive 14a with the turbine wheel 10a, rotate in directions opposite to each other, whereas the shafts 7 and 13 of FIG. 1 rotate in the same direction. Depending on the design of the converter as forward converter or rearward converter, it will be evident that with all transmissions according to the present invention, the power dividing or power totalizing transmission must be so designed and connected that the direction of rotation of the turbine wheel will be taken into consideration.

The further design of the transmission according to FIG. 1a corresponds to that of the transmission of FIG. 1. The input shaft 1 is connected to the outer gear ring 2a of the planetary gear transmission 3a, while the guide wheel 11a is connected to shaft 20. The planetary gear carrier 5a is arranged on shaft 13a, the extension of which is formed by shaft 15.

With the transmissions according to FIGS. 1 and 1a, two forward speeds and one rearward speed will be obtained.

FIG. 2 illustrates with regard to FIG. 1 which of the band brakes 12, 18 and 24 have to be pulled in order to make the various speeds effective and in order to obtain a purely mechanical (*m*), a purely hydraulic (*h*) or a mixed hydromechanical (*hm*) power transmission. The designations *m*, *h* and *hm* are correspondingly employed in FIGS. 4, 6, 8, 11, 13 and 15. The first forward speed G1 is obtained by pulling the band brake 12 and represents a differential torque converter speed *hm* at which no rigid transmission prevails between the engine and the output shaft but instead, the transmission between input shaft and output shaft is adapted to the driving resistance. If furthermore the band brake 24 is pulled, the second forward speed G2 is made effective. In this instance, the power passes through transmission parts 1, 2, 4, 5, 13, 15, 17, 21 to 23 and 1, 2a, 4a, 5a, 13a, 15, 17, 21 to 23 respectively. Thus, a purely mechanical speed (*m*) prevails. With this speed, the free wheel drive 14, 14a is in disengaged position which means that the converter in its entirety is at a standstill and causes no losses whatsoever. Inasmuch as according to FIG. 1, the two planetary gear transmissions are of identical design and are arranged in an image symmetrical manner, the rigid transmission ratio of the transmission in the first speed is 1:1, which means that the input and output speeds equal each other. The shifting from the first forward speed to the second forward speed is, in this instance and with the transmission of FIG. 1a, effected in an overlapping manner without interruption of the pulling force.

If brakes 12 and 24 are disengaged, and if brake 18 is pulled, the rearward speed R, G will be obtained. By means of the now pulled brake 18 and the now engaged free wheel drive 14, 14a, the turbine wheel 10, 10a is held stationary. The guide wheel, which normally absorbs the reaction force, is now able to rotate and will with the forward converter and also with the rearward converter rotate in a direction opposite to the direction of operational rotation of the turbine wheel so that the rearward speed will respectively to obtained through the transmission members 1, 2, 4, 6, 7, 8, 11, 20, 19, 21, 22 and 23 and 1, 2a, 4a, 6a, 7a, 8a, 11a, 20, 19, 21, 22, and 23. Thus, a power torque converter speed prevails. If all brakes are disengaged, the idling of the transmission will be obtained.

FIG. 3 illustrates a further two-speed transmission in which instead of a power guiding transmission there is provided a totalizing transmission, and instead of the subsequent planetary gear transmission there is provided a simple spur gear transmission with separating clutches. As will be evident from FIG. 3, the engine acts upon an input shaft 30 which is connected to the sun wheel 31 of a totalizing planetary gear transmission 32 and is furthermore connected through spur gears 33, 34, separating clutch 38, and hollow shaft 35 with the pump wheel 36 of fluid flow converter 37. The separating clutch 38 makes it possible to interrupt the connection between input shaft and pump wheel 36. The turbine wheel 39 is adapted by means of brake 40 to be held stationary and is furthermore connected with a shaft 41 which, through the intervention of a spur gear 42, acts upon the outer gear ring 43 of the planetary gear transmission 32. The sun wheel 31, as well as the outer gear ring 43, mesh with the planetary gear wheel 44 on planetary gear carrier 45, which latter is connected to a shaft 47. A separating clutch 48 makes it possible selectively to connect shaft 47 with the output shaft 49.

The rotatable guide wheel 50 of the converter 37 is connected to a spur gear 51 meshing with a spur gear 52 keyed to a shaft 53. The shaft 53 equipped with a separating clutch 57 has furthermore mounted thereon a spur gear 54, which through the intervention of spur gears 55 and 56 is drivingly connected to the output shaft 49 so that guide wheel 50 and output shaft 49 will rotate in opposite direction with regard to each other. Guide wheel 50 is adapted to be held stationary by means of a brake band 58.

The first speed (differential converter speed G1) is obtained with reference to FIG. 4 by engaging clutches 38, 48 and braking guide wheel 50 by means of brake band 58 so as to hold said guide wheel 50 stationary. The power flow will then be divided into the hydraulic power path 30, 33, 34, 38, 35, 36, 39 and 41 to 44 and into the mechanical power path 30, 31. Both power paths unite in the totalizing transmission 32. From here the united power flow passes through 45, 47, 48 to the output shaft 49. The purely mechanical second speed G2 is now engaged by disengaging clutch 38 and pulling brake 40 while brake 58 remains pulled and clutch 48 remains engaged. The motor torque will then be transmitted through 30, 31, 44, 45, 47 and 49. The torque converter will be at a standstill. With the rearward speed, only brake 40 is pulled and clutches 38 and 57 are engaged so that the power flow will be effected through 30, 33, 34, 38, 35, 36, 50 to 56 and 49, while the guide wheel 50 is driven in a direction counter to the direction of rotation of turbine 39. The construction shown in FIG. 3 may be further simplified for instance by combining the clutches 48, 57 into a jaw clutch for selectively connecting shaft 47 or spur gear 56 to output shaft 49.

The transmission according to FIG. 5 corresponds substantially to that of FIG. 1 with the difference that according to FIG. 5 an additional forward drive is provided between guide wheel and pump wheel of the converter. An input shaft 65 is connected to the outer gear ring 66 of a planetary gear transmission 64, which gear ring 66 is drivingly connected to a sun wheel 69 through the intervention of double planetary gear wheels 67, 68. The sun wheel 69 is keyed to a hollow shaft 70 which is adapted by means of a brake band 71 to be held stationary and to which is keyed the pump wheel 72 of a fluid flow converter 73.

The planetary gear wheel carrier 74 of the double planetary gear wheels 67, 68 is connected to a shaft 75 adapted to be driven by a turbine wheel 76 through a free wheel drive 77. The extension or connecting shaft 78 of shaft 75 is connected to the planetary gear wheel carrier 79 of a subsequent planetary gear transmission 89. said planetary gear carrier 79 carries double planetary gear wheels 80, 81 and is adapted to be held stationary by means of a brake 82. The outer gear ring 83 is drivingly connected to the output shaft 84 of the transmission. The rotatable guide wheel 85 of converter 73 is adapted to be held stationary by means of a brake band 86 and is further more connected on one hand to hollow shaft 70 through a free wheel drive 87, and on the other hand to sun wheel 88 of the planetary gear transmission 89.

The various shifting possibilities for the transmission of FIG. 5 will now be explained by the table of FIG. 6. The cross marks in this table indicate which brakes are pulled and which free wheel drives are blocked. The two forward speeds G1 and G2 of the rearward speed RG are shifted in the same manner as described in connection with FIG. 1. The additional free wheel drive 87 furthermore makes possible to start a vehicle by towing the same without the necessity of pulling a brake. In view of the now coupling free wheel drive 87, both sun wheels 69 and 68 of the planetary gear transmissions 64 and 69 are drivingly connected to each other. Consequently, when towing the vehicle, the power flow from the output shaft 84 is transmitted through two mechanical branches, namely 83, 81, 80, 88, 85, 87 and 69 to 65, and through 83, 81, 80, 79, 78, 75, 74 and 68 to 65. This corresponds to a rigid coupling of the transmission if both planetary gear transmissions 64 and 89 have the same transmission ratio.

In addition to braking by means of the engine, a hydraulic brake operation is possible through the free wheel drive 87 if brake 82 only is actuated. This braking operation is effected due to the fact that pump wheel 72 and guide wheel 85 are coupled to each other through free wheel drive 87 and are driven in working direction against turbine wheel 76 which is held stationary by brake 82. To this is to be added the braking by the motor through the further transmission parts 65 to 70.

This arrangement of the free wheel drive between guide wheel and pump wheel of the flow converter for purposes of starting the vehicle by towing and for purposes of additionally hydraulically braking, is principally possible with all transmissions according to FIGS. 3, 7, 9, 12 and 14. However, for purpose of clarity of these figures, the free wheel drive for braking and starting by towing has been shown only in connection with the embodiment of FIG. 5.

The transmission of FIG. 7 differs from that of FIG. 1 in that the torque converter is adapted to be bridged and in that the guide wheel is connected to the subsequent transmission through the intervention of a free wheel drive. An input shaft 95 is connected to the outer gear ring 96 of a planetary gear transmission 94. Gear ring 96 is drivingly connected to a sun wheel 99 through the intervention of pairs of planetary gears 97 on planetary gear carrier 98. Sun wheel 99 is keyed to a hollow shaft 100 and is adapted to be held stationary by means of a brake 101. Keyed to shaft 100 is the pump wheel 103 of a fluid flow converter 102. The turbine wheel 104 of the converter 102 is adapted drivingly to be connected to a shaft 106 by means of a free wheel drive 105 adapted to be blocked by a blocking device 105a. Shaft 106 is furthermore connected to the planetary gear carrier 98. Shaft 100, which could also be termed pump wheel shaft, is provided with a clutch 107 which makes it possible to establish driving engagement between shaft 100 and turbine wheel 104. A connecting shaft 108 connects shaft 106 and free wheel drive 105 with a planetary gear carrier 110 of a subsequent planetary gear transmission 109. The outer gear ring 114 of this transmission 109 is drivingly connected with the output shaft 112 of the transmission. The planetary gear carrier 110 is composed of pairs of planetary gear wheels 119 and is adapted to be held stationary by a brake 113. The sun wheel 111 is adapted to be held stationary by a brake 115 and is furthermore adapted to be connected to the guide wheel 117 of converter 102 through a free wheel drive 116. Guide wheel 117 is rotatably arranged and is adapted to be held stationary by a brake 118. With the transmission arrangement according to FIG. 7a differing from that of FIG. 1 in that it comprises only one other power dividing planetary gear transmission 94a, the inner gear 96a on output shaft 95 meshes with a planetary gear wheel 97a. Mounted on the shaft 97c of this planetary gear wheel 97a is a further planetary gear wheel 97b which meshes with a further inner gear ring 99a keyed to shaft 106. The planetary gear wheels 97a and 97b are journalled in a planetary gear carrier 98a keyed to shaft 100 and adapted to be held stationary by means of a brake 101.

The two-plane planetary gear transmission 94a according to FIG. 7a brings about the same directions of rotation and as the case may be also the same speeds of shafts 100 and 106 as the shafts 100 and 106 of the one-plane planetary gear transmission 94 of FIG. 7, provided that the directions of rotation and the speeds of the input shafts 95 of FIGS. 7 and 7a are equal to each other.

The transmissions according to FIGS. 7 and 7a each permit three forward speeds G1, G2, G3, as will be evident from FIG. 8. The lowermost and highest speeds G1 and G3 are made effective in a manner similar to that described in connection with FIG. 1. Sun wheel 111 of the subsequent transmission is adapted to be held stationary by means of brake 115. At the same time in forward speed—converter speed G1—the guide wheel rests through free wheel 116 on brake 115. The intermediate speed G2, which similar to the third speed G3 is purely mechanical, is obtained by bridging the converter by means of clutch 107 at the speed condition of G1. In the intermediate speed G2, due to the free wheel drive 116, the guide wheel 117 can rotate together with pumps 103 and turbine wheel 104. The converter 102 thus rotates in its entirety and is ineffective. In the above explained forward speed G3—mechanical speed—the clutch 107 may remain engaged. The shifting from G2 to G3 is effected in an overlapping manner and free from any interruption in the transmission of the pulling power.

When the rearward speed is to be engaged, brake 113 alone will be pulled. During the power transmission through the rearward moving guide wheel 117 and through pump wheel 103, the free wheel drive 116 will exert its coupling effect. When in the second speed G2 the power supply is withdrawn by the motor, the free wheel drive 105 will become free. With sufficient reduction in the motor speed, the pump wheel and thus also the turbine wheel coupled thereto will start to turn in rearward direction. Inasmuch as the rearward movement of the guide wheel is prevented by free wheel drive 116 (brake 115 being pulled), the converter will then absorb a braking power. If it is desired to brake by the engine (B1), it is necessary additionally to block the free wheel drive 105 by means of the blocking device 105a. In this instance the planetary gear transmission 94, 94a and the converter will rotate as a block. If in addition thereto brake 118 is pulled, guide wheel 117 will be held stationary. The torque converter will now act as additional hydrodynamic brake B2.

In the third speed (mechanical speed) additionally for purposes of braking, a hydrodynamic braking operation B3 can be carried out by the motor. To this end, following the disengagement of clutch 107, the blocking device 105a is made effective so that the turbine wheel will rotate while the pump wheel will be at a standstill. By pulling the brake 118, the guide wheel may be brought to a standstill which results in a hydrodynamic braking operation B4.

A further increase in the number of speeds can be obtained with the transmission according to FIG. 9. Subsequent to the planetary gear transmission there is in this instance provided a fourth member. Otherwise, the transmission of FIG. 9 corresponds substantially to that of FIG. 7 while no use has been made of the possibility to bridge the converter by a coupling. With the arrangement of FIG. 9, five forward speeds and one rearward speed and one braking speed with motor and hydraulic braking operation will be available.

An input shaft 125 drives the outer gear 126 of a planetary gear transmission 127 which gear ring 126 is drivingly connected with the sun wheel 130 through two intermeshing planetary gears 128, 129. Sun wheel 130 is mounted on one end of a hollow shaft 131 while a pump wheel 133 of a fluid flow converter 132 is mounted on the other end of said shaft 131. The hollow shaft 131 is adapted to be braked to a standstill by means of a brake band 134. The planetary gear carrier 135 of the planetary gear transmission 127 is mounted on a shaft 136 to which is connected the turbine wheel 138 of converter 137. The extension of shaft 136 is formed by a connecting shaft 157 which latter continues the now united hydraulic and mechanical power paths. The guide wheel 139 which is rotatably journalled and adapted to be held stationary by a brake band 140 is through a further free wheel drive 141 connected to a hollow shaft 142 adapted to be held stationary by a brake 143, said shaft 142 surrounding the connecting shaft 157.

Hollow shaft 142 carries the sun wheel 145 of a four-member planetary gear transmission 144 the gears of which are diagrammatically shown in side view in FIG. 10. The planetary gear carrier 146 is mounted on the connecting shaft 157 and carries the planetary wheels 174 to 149. While the sun wheel 145 meshes with the planetary wheel 147 and the latter meshes with the planetary wheel 148, the planetary wheel 148 is meshing with the outer gear ring 150 which latter is drivingly connected to the output shaft 151. A second sun wheel 152 meshes with the planetary wheel 149 which latter meshes with the planetary wheel 148. The planetary gear carrier 146 is adapted to be braked to a standstill by means of a brake band 153, and similarly the sun wheel 152 may be held stationary by means of a brake band 154. The sun wheel 152 is furthermore adapted by means of a brake 156 to be held stationary in one direction of rotation through a free wheel drive 155.

In view of the fourth member 152 of the planetary gear transmission which has associated therewith a brake 154, 156, further speeds will be obtained. When the guide wheel brake 140 is disengaged, the sun wheel 145 will similar to the rearward speed of the above described transmissions rotate counter to the direction of rotation of the turbine wheel 138 of the converter when the free wheel drive 141 is in its engaging position. In view of the sun wheel 152 being held stationary by pulling the brake 156 or 154, this return movement will be conveyed to the output shaft 151 in a forward direction. In the lowermost speed with power division through shaft 157, this torque has superimposed the customary torque with the above described transmissions so that in view of the twofold torque converter transmission and in view of a larger stepdown ratio with regard to the lowermost speed of the above mentioned transmissions according to FIGS. 1, 3, 5 and 7, an increased starting moment will be obtained. In this way, the lowermost speed G1 of the transmission according to FIG. 9 will have the following three power paths:

(a) 125, 126, 128, 129, 135, 136, 157, 146, 148, 150, 151 (mechanical branch).

(b) 125, 126, 128, 129 to 131, 133, 138, 137, 157, 146, 148, 150, 151 (hydraulic branch I), (c) 125, 126, 128, 129 to 131, 133, 139, 141, 142, 145, 147, 148, 150, 151 (hydraulic branch II).

By pulling brake 140 a further possible speed will be obtained, namely the second speed G2 which with the other transmissions referred to above appears as the lowermost speed. If for G1, brake 154 instead of 156 had been pulled, it would now be necessary to disengage the same. If, however, for G1 brake 156 has been pulled, it may remain in its engaged position for the second speed G2. When now the guide wheel is kept stationary by the brake 140, the free wheel drive 155 will be disengaged. The second speed also operates with power division and, more specifically, with the above mentioned power paths $a$ and $b$.

For obtaining the third speed G3, in addition to brakes 140 and 156 also brake 134 will be pulled. At the operator's discretion, selectively brake 140 may be disengaged. As a result thereof, the hydraulic branch will be disengaged. The third speed G3 is thus a purely mechanical speed.

For the fourth speed G4, additionally brake 143 is pulled while selectively brakes 140 and 156 may be disengaged. By pulling brake 143, the sun wheel 145 will be kept stationary whereas sun wheel 152 will rotate forwardly and will disengage itself from the possibly pulled brake 156 due to free wheel drive 155. All shifts from one speed to another speed will be effected in an overlapping manner and free from any interruption in the pulling force.

With the transmission according to FIG. 9 it is possible to obtain a further differential torque converter speed which as far as its transmission ratio is concerned preferably is located between the second and third speed. For this intermediate speed G2/3, only brake 143 will be pulled. Selectively, brakes 140 and 156 may additionally have been pulled. By pulling brake 143, sun wheel 145 of the planetary gear transmission 144 is held stationary and thus so to speak a fast speed position of the subsequent planetary gear transmission 144 is obtained which was already taken advantage of during the fourth speed G4 in connection with the purely mechanical power path. This fast speed position is now combined with the ordinary differential torque converter speed 62 whereby an increase in the output speed over G2 will be obtained.

The sequence of the speeds with regard to their transmission ratios is in most instances G1, G2, G2/3, G3, G4. Three differential torque converter speeds thus follow two mechanical speeds.

The danger of overlapping can be avoided by designing the gears of the transmission in such a way that two hydro-mechanical speeds G, G2 are followed by a mechanical speed G3 which all form a slow driving range with automatic shift (simple automatic shifting from one speed to the next speed without particular means concerning an interruption in the power flow and overlapping being possible). A fast drive range, likewise with automatic shift, will then be formed by a hydraulic speed G2/3 and a mechanical speed G4. For the speed shifting from G2 to G3 and from G2/3 to G4, the same automatic shifting may be used because in both instances brake 134 is actuated. The selection between the two ranges is effected by the driver, for instance during idling of the engine. With this arrangement of the speeds in two ranges, even brake 156 and free wheel drive 155 will become superfluous because these transmission parts would be necessary only when shifting from G2 to G2/3. This shifting over does, however, not exist with this arrangement. The function of these parts can be carried out by brake 154.

The rearward speed RG is obtained by braking brake 153 by the power path of the rotating guide wheel 139 of the converter as has already been described in connection with the rearward speeds of the above mentioned transmission designs.

Due to the fact that in the third speed G3 brake 154 is engaged and thus sun wheel 154 is completely blocked (not only in one direction) through free wheel drive 155 and brake 156, a brake speed $b$ is obtained. Further brake speeds are possible similar to the transmissions of FIGS. 1 and 5.

A further transmission illustrated in FIG. 12 corresponds substantially to the transmission of FIG. 1. This further transmission makes it possible, similar to the transmission of FIG. 1, to obtain two forward speeds and one rearward speed. In contrast to the arrangement of FIG. 1, one planetary gear transmission each with only simple plane wheels is employed as power dividing transmission and as subsequent transmission. Moreover, the drive shaft and the driven shaft are not in alignment with each other.

In order to make sure that when employing a forward converter and a simple planetary gear transmission, the pump wheel shaft and the shaft to be connected to the turbine wheel will have the same direction of rotation, the output shaft 160 is connected to the planetary gear carrier 162 of the dividing planetary gear transmission 161. Furthermore, the sun wheel 163 is connected to the pump wheel 168 of a converter 171 through a hollow shaft 166 which is adapted to be braked to a standstill and held at a standstill by brake 167. The outer gear ring 165 of the planetary gear transmission drives shaft 173 guided inside the hollow shaft 166. Connected to shaft 173 through a free wheel drive 174 is the turbine wheel 169 of converter 17. The mechanical power path and the hydraulic power path have been combined behind the free wheel drive 174 and by means of connecting shaft 175 (extension of shaft 173) are passed to the outer gear 177 of a subsequent planetary gear transmission 176. This connecting shaft 175 is adapted by means of a brake 181 to be held stationary. The guide wheel 170 of the torque converter 171 is rotatably journalled, provided with a brake 172 and is connected to the sun wheel 178 of the planetary gear transmission 176. Planetary gear wheels 179 are arranged on a planetary gear carrier 180 which through a hollow shaft 182 and through a pair of spur gears 183/184 is drivingly connected to the output shaft 185. In order to permit shaft 175 to be braked to a standstill, shaft 175 is made accessible by the gear through the arrangement of a hollow shaft 182. The output shaft 185 will then not be aligned with the input shaft 160.

In order with this arrangement of the planetary gear transmissions 161 and 176 to make it possible that the input shaft 160 and the output shaft 185 are in alignment with each other, the torque converter 171 may be replaced by a through-drive converter (Durchtriebwandler). With said last mentioned converter, a hollow shaft with the speed of the turbine wheel would be passed between guide wheel 170 and hollow shaft 160 to an accessible point and would be connected to a brake (for instance arranged adjacent to brake 167). While in this instance this brake would be connected to shaft 174 through the free wheel drive 174 only, the free wheel drive 175 would require blocking means.

The shifting possibilities of the transmission according to FIG. 12 are set forth in FIG. 13. These possibilities correspond in principle to those of the transmission of FIG. 1.

Finally, the transmission of FIG. 14 is a further development of the transmission of FIG. 7. It differs from the arrangement of FIG. 7 aside from a different type of power dividing planetary gear transmission in that a further free wheel drive 199 and a further brake 198 are provided. The free wheel drive 199 is, when looking in the power flow direction, arranged behind the member 196 of the power dividing planetary gear transmission 193 which is drivingly connected to the mechanical power path. The power dividing planetary gear transmission 193 is disengaged when the connecting shaft 210 between the hydraulic and mechanical power paths on one hand and the subsequent transmission 214 on the other hand tends to rotate faster in the direction of rotation than the member 196 of the planetary gear transmission 193. Moreover, free wheel drive 199 is adapted by means of a blocking device 199a to be blocked. Brake 198 is likewise connected to the member 196 of the planetary gear transmission 193. The transmission in this arrangement makes possible four forward speeds, one rearward speed and one further braking speed.

More specifically, the input shaft 190 is through a pair of spur gears 191, 192 connected to the planetary gear carrier 194 of a simple planetary gear transmission 193 with planetary gears 195. The outer gear ring 196 which is adapted to be held stationary by a brake 198 is drivingly connected to shaft 200 by means of free wheel drive 199 which is adapted to be blocked by means of a blocking device 199a. The sun wheel 197 of the planetary gear transmission 193 is mounted on a shaft 201 which is adapted by means of a brake 202 to be held stationary and which leads to the pump wheel 204 of a fluid flow converter 203. The turbine wheel 205 of converter 203 is through a free wheel drive 209 adapted to be blocked by a blocking device 209a drivingly connected to shaft 200, the extension of which is formed by the connecting shaft 210. Pump wheel 204 and turbine wheel 205 are adapted to be coupled to each other by means of friction clutch 211. The guide wheel 206 of converter 203 is adapted through a free wheel drive 212 to be connected to a sun wheel 215 of a subsequent planetary gear transmission 214, said sun wheel 215 being adapted to be held stationary by a brake 213. The connecting shaft 210 carries the outer gear ring 216.

The output shaft 220 is drivingly connected to the planetary gear carrier 218 which latter carries planetary gears 217. The obtainable speeds are obvious from the diagram of FIG. 15. The arrangement of a brake 207 for blocking the guide wheel 206 will result in further braking possibilties.

It is, of course, to be understood that the present invention is, by no means, limited to the particular constructions shown in the drawings but also comprises any modifications within the scope of the appended claims.

What we claim is:

1. A motor vehicle transmission having an input shaft, a change gear transmission and an output shaft, which comprises in combination: a mechanical power path, a hydraulic power path arranged in parallel to said mechanical power path and including a torque converter having a pump wheel and a turbine wheel and a guide wheel, brake means operable for selectively braking said guide wheel against rotation, said two power paths branching away from ecah other at a first power dividing point drivingly connectable to said input shaft and uniting again at a second power totalizing point drivingly connectable to a first element of said change gear transmission, power dividing means drivingly connecting said input shaft to the beginning of said two power paths, power totalizing means drivingly connecting at least one element of said change gear transmission to the end of said two power paths, at least one of said two last mentioned means including a planetary gear transmission, means operatively connected to said hydraulic power path for selectively making the same ineffective, whereby the mechanical power path conveys the total torque from the input shaft to the said second point, said change gear transmission comprising a second element drivingly connected to said guide wheel, and means operable to establish driving connection of at least one of said elements with said output shaft.

2. A motor vehicle transmission according to claim 1, in which a free wheel drive is arranged between said pump wheel and said guide wheel and is operable to interrupt the connection between said pump wheel and said guide wheel when the latter is at standstill and said pump wheel rotates in its operational direction.

3. A motor vehicle transmission having an input shaft, shaft means and an output shaft, which comprises in combination: a mechanical power path, a hydraulic power path arranged in parallel to said mechanical power path and including a torque converter having a primary shaft drivingly connectable to said input shaft and a pump wheel connected to said primary shaft and also having a turbine wheel and a guide wheel, holding means operable selectively for holding said turbine wheel stationary, said guide wheel being rotatably journalled, brake means operable to hold said guide wheel stationary, said brake means being selectively disengageable from said guide wheel to allow rotation thereof, said two power paths branching away from each other at a first point drivingly connectable to said input shaft and uniting again at a second point drivingly connectable to said shaft means, said second point including a power totalizing planetary gear transmission, a first member of said planetary gear transmission being drivingly connected to said shaft means, a second member of said planetary gear transmission being drivingly connected to said mechanical path, a third member of said planetary gear transmission being drivingly connected to said hydraulic path, means associated with said primary shaft and operable selectively for disconnecting said primary shaft from said input shaft, a change gear transmission, a first element of said change transmission drivingly connected to said shaft means, said change gear transmission comprising a second element drivingly connected to said guide wheel, and means operable to establish driving connection of at least one of said elements with said output shaft.

4. A motor vehicle transmission according to claim 3, in which said means for disconnecting said primary shaft from said input shaft and said means for establishing driving connection of said elements of said change transmission are selectively engageable clutch means.

5. A motor vehicle transmission having an input shaft, shaft means and an output shaft, which comprises in combination: a mechanical power path, a hydraulic power path arranged in parallel to said mechanical power path and including a torque converter having a pump wheel and turbine wheel and a guide wheel, said guide wheel being rotatably journalled, brake means operable to hold said guide wheel stationary, said brake means being selectively disengageable from said guide wheel to allow rotation thereof, said two power path branching away from each other at a first point drivingly connectable to said input shaft and uniting again at a second point drivingly connectable to said shaft means, said first point including a power dividing planetary gear transmission, a first member of said planetary gear transmission being drivingly connected to said input shaft, a second member of said planetary gear transmission being drivingly connected to said mechanical path, a third member of said planetary gear transmission being drivingly connected to said hydraulic path, brake means operatively connected to said pump wheel for selectively braking the same to thereby hold said pump wheel stationary and thereby making said hydraulic path ineffective, whereby the mechanical power path conveys the total torque from the input shaft to the said second point, a change gear transmission having a first element drivingly connected to said shaft means and having a second element drivingly connected to said guide wheel, and means operable to establish driving connection of at least one of said elements with said output shaft, and free wheel means arranged between said turbine wheel and said second point and operable in response to a rotational speed higher than that of said turbine wheel to disengage the connection between said turbine wheel and said shaft means.

6. A motor vehicle transmission according to claim 5, which includes locking means for locking said free wheel means.

7. A motor vehicle transmission according to claim 5, in which said change gear transmission is formed by a planetary gear transmission comprising three elements, the first element being drivingly connected to said shaft means, the second element being drivingly connected to said guide wheel, the third element being drivingly connected to said output shaft, said means for establishing driving connection of at least one of said two first elements with said output shaft being formed by a brake operatively connected to said first element for selectively braking the same to thereby hold said shaft means stationary.

8. A motor vehicle transmission according to claim 7, in which said power dividing planetary gear transmission and said planetary gear transmission forming the change gear transmission are of identical design.

9. A motor vehicle transmission according to claim 5, which includes coupling means for coupling said pump wheel with said turbine wheel, that portion of said coupling means which is connected to said turbine wheel being arranged between the latter and said free wheel means.

10. A motor vehicle transmission according to claim 5, which includes a free wheel drive operatively connected between said guide wheel and said second element of said change gear transmission and arranged behind said guide wheel when looking in the direction of power flow, and which also includes brake means for braking selectively said second element of said change gear transmission.

11. A motor vehicle transmission having an input shaft, shaft means and an output shaft, which comprises in combination: a mechanical power path, a hydraulic power path arranged in parallel to said mechanical power path and including a torque converter having a pump wheel and turbine wheel and a guide wheel, said guide wheel being rotatably journalled, brake means operable to hold said guide wheel stationary, said brake means being selectively disengageable from said guide wheel to allow rotation thereof, said two power paths branching away from each other at a first point drivingly connectable to said input shaft and uniting again at a second point drivingly connectable to said shaft means, said first point including a power dividing first planetary gear transmission, a first member of said first planetary gear transmission being drivingly connected to said input shaft, a second member of said first planetary gear transmission being drivingly connected to said mechanical path, a third member of said first planetary gear transmission being drivingly connected to said hydraulic path, brake means operatively connected to said pump wheel for selectively braking the same to thereby hold said pump wheel stationary and thereby making said hydraulic path ineffective, whereby the mechanical power path conveys the total torque from the input shaft to the said second point, a second planetary gear transmission having a first element drivingly connected to said shaft means and having a second element drivingly connected to said guide wheel and having a third element drivingly connected to said output shaft, brake means for selectively braking said first element of said second planetary gear transmission, and free wheel means located between said brake means and said second point and being operable to interrupt driving connection between said second member of said first planetary gear transmission and said mechanical power path in response to said shaft means tending to run ahead of said second member.

12. A motor vehicle transmission according to claim 11, which includes locking means for locking said free wheel means.

13. A motor vehicle transmission having an input shaft, shaft means and an output shaft, which comprises in combination: a mechanical power path, a hydraulic power path arranged in parallel to said mechanical power path and including a torque converter having a pump wheel and turbine wheel and a guide wheel, said guide wheel being rotatably journalled, brake means operable to hold said guide wheel stationary, said brake means being selectively disengageable from said guide wheel to allow rotation thereof, said two power paths branching away from each other at a first point drivingly connectable to said input shaft and uniting again at a second point drivingly connectable to said shaft means, said first point including a power dividing first planetary gear transmission, a first member of said first planetary transmission being drivingly connected to said input shaft, a second member of said first planetary gear transmission being drivingly connected to said mechanical path, a third member of said first planetary gear transmission being drivingly connected to said hydraulic path, brake means operatively connected to said pump wheel for selectively braking the same to thereby hold said pump wheel stationary and thereby making said hydraulic path ineffective, whereby the mechanical power path conveys the total said torque from the input shaft to the said second point, a second planetary gear transmission having a first element drivingly connected to said shaft means and having a second element drivingly connected to said guide wheel and having a third element drivingly connected to said output shaft and having a fourth element, brake means for selectively braking said fourth element and other brake means for selectively braking said first element of said second planetary gear transmission.

14. A motor vehicle transmission according to claim 13, which includes an additional brake and also includes a free wheel drive, said free wheel drive interconnecting said fourth element with said additional brake.

References Cited by the Examiner
UNITED STATES PATENTS

| | | | |
|---|---|---|---|
| 2,402,164 | 6/46 | Kelbel | 74—677 |
| 2,414,359 | 1/47 | Carnagua et al. | 74—677 |

DON A. WAITE, *Primary Examiner*.